_United States Patent_ [19]

Higgs et al.

[11] 3,812,706

[45] May 28, 1974

[54] CONSISTOMETER

[75] Inventors: Kenneth O. Higgs, Port Neches; Robert C. Richmond; Lawrence F. Marsch, both of Port Arthur, all of Tex.

[73] Assignee: Texaco Inc., New York, N.Y.

[22] Filed: Dec. 10, 1971

[21] Appl. No.: 206,717

[52] U.S. Cl. .................................................. 73/59
[51] Int. Cl. .......................................... G01n 11/14
[58] Field of Search .................................. 73/59, 54

[56] References Cited
UNITED STATES PATENTS

| | | | |
|---|---|---|---|
| 3,162,038 | 12/1964 | Roberson et al. | 73/59 |
| 3,181,348 | 5/1965 | Lewis | 73/59 X |
| 3,402,729 | 9/1968 | Richmond et al. | 73/59 X |
| 3,572,086 | 3/1971 | Johnston | 73/59 |
| 3,668,677 | 6/1972 | Higgs | 73/59 X |

*Primary Examiner*—Richard C. Queisser
*Assistant Examiner*—Joseph W. Roskos
*Attorney, Agent, or Firm*—Thomas H. Whaley; C. G. Reis

[57] ABSTRACT

An apparatus for continuously measuring the consistency of a stream of material, such as grease, comprising a resilient member located in the stream so that the two surfaces about which it is flexible are parallel to the direction of the flow of the material in the stream. Means are provided for rotating the resilient member at a constant rate about an axis which is parallel to the direction of flow of the stream. Means are provided for measuring the reaction forces exerted on the resilient member as it rotates by determining its condition of flexure, said means including a relatively rigid reference member and means for rotating the reference member in synchronism with the resilient member, together with means for periodically detecting the relative positions of the resilient member and the rigid reference member as the resilient member is rotated in the stream of material. In one embodiment, the rigid reference member and the resilient member are mounted to a common shaft and their relative positions determined periodically as the two members are rotated at a constant rate past respective magnetic detectors coupled to an electric circuit means for measuring any time displacement between the passage of the two members as they travel past their respective detectors.

33 Claims, 3 Drawing Figures

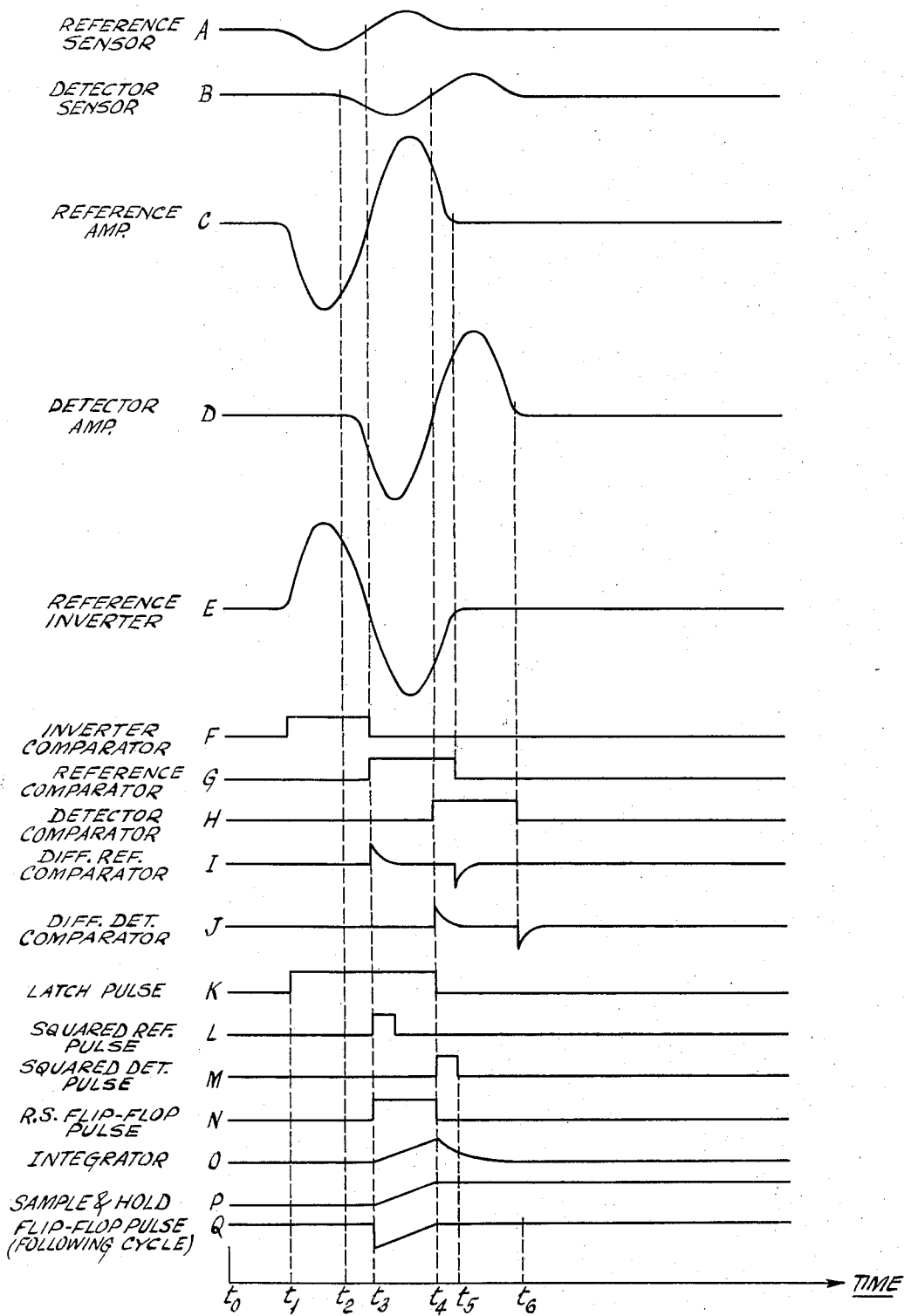

CONSISTOMETER

BACKGROUND OF THE INVENTION

This invention relates to apparatus for measuring the consistency of a material and, more particularly is directed to improvements in apparatus capable of continuously measuring the consistency of a material, such as grease, as it flows through a conduit as a stream of material.

DESCRIPTION OF THE PRIOR ART

Apparatus has been developed for providing a continuous measure of consistency, but for the most part, such apparatus depends upon maintaining a constant flow rate of the material whose consistency is being measured. For example, in some of this apparatus, a resiliently mounted probe is located in the flow path and is displaced by the force of the flowing material thereon by an amount which is correlated with the consistency of the material. Such apparatus requires that the flow rate be maintained constant, otherwise, fluctuations of the force on the probe due to changes in flow rate will introduce undesired errors into the measurement.

Other apparatus has been developed for measuring the consistency of a material by measuring the reaction of the material on a member rotated in the material to be measured and wherein the reaction of the material on the rotating member may be measured as a change in torque required to maintain a constant speed of rotation. Problems associated with this type of apparatus include the errors which arise as a result of bearing loading and packing loading and the changes which occur in same with time due to wear. These variable changes in the apparatus give rise to changes in torque which cannot be distinguished from the torque generated to overcome the reaction of the material whose consistency is being measured.

The disadvantages of apparatus, such as that described above, requiring constant flow rate or requiring accurate measurement of torque have been overcome in apparatus wherein a flexible member is rotated about an axis parallel to the direction of flow of the material in the stream to be measured so that changes in the flexure of the flexible member can be used to determine the consistency of the material. Apparatus of this type is disclosed for example, in U.S. Pat. No. 3,402,729, issued Sept. 24, 1968 to Richmond et al. The referenced patent discloses the use of a flexible member of the type described having strain gauges mounted thereon to provide an indication of the consistency of the material by measuring the reaction forces thereon due to the material as it flows past the member. While such apparatus is capable of providing a satisfactory measure of consistency, especially of anhydrous greases and the like, it usually requires the use of slip rings to connect the strain gauges to appropriate electrical resistance measuring instruments outside of the stream of material being measured. Also, apparatus of this type, requiring the mounting of strain gauges on the flexible member, is subject to certain mechanical and materials problems involved in constructing and maintaining an electro-mechanical structure of the type wherein a strain gauge is mounted in or on a flexible member subjected to the various forces encountered as the blade is rotated in the material being measured. Moreover, certain materials being measured, such as water-based greases, are likely to have an adverse effect with time on the electrical resistance of the strain gauges of the blade structure, thus introducing possible errors if the blade structure is not changed from time to time.

It is an object of the present invention to provide improvements in apparatus of the type disclosed in the reference patent of Richmond et al., wherein it is not necessary to utilize strain gauges or the like on the resilient member or within the measuring chamber for measuring the amount of flexure of such resilient member in a stream of material whose consistency is to be measured.

SUMMARY OF THE INVENTION

Briefly stated, the present invention relates to apparatus for measuring the consistency of a stream of material comprising a resilient member located in the stream so that the two surfaces about which the member is flexible are parallel to the direction of the flow in the stream. Means are provided for rotating the member at a constant rate about an axis which, advantageously, is preferably parallel to the direction of the flow of the material and novel means are provided for measuring the reaction forces exerted on the resilient member by the material during such rotation, including a relatively rigid reference member and means for rotating same in synchronism with the resilient member, together with means for periodically detecting the relative positions of the resilient member and the rigid reference member as the resilient member is rotated in the stream of material.

In a preferred embodiment the rigid reference member and the resilient member are mounted on a common shaft and means are provided for determining their relative positions periodically as the two members are rotated at a constant rate, said means comprising respective magnetic detectors coupled to an electric circuit for measuring any time displacement between the passage of the two members as they travel past their respective detectors.

BRIEF DESCRIPTION OF THE DRAWINGS

FIG. 3 is a graphic illustration showing the wave form of various signals appearing at various parts of the circuit shown in FIG. 2, as described in further detail hereinafter.

DETAILED DESCRIPTION OF THE PREFERRED EMBODIMENT OF THE INVENTION

Figure 1:
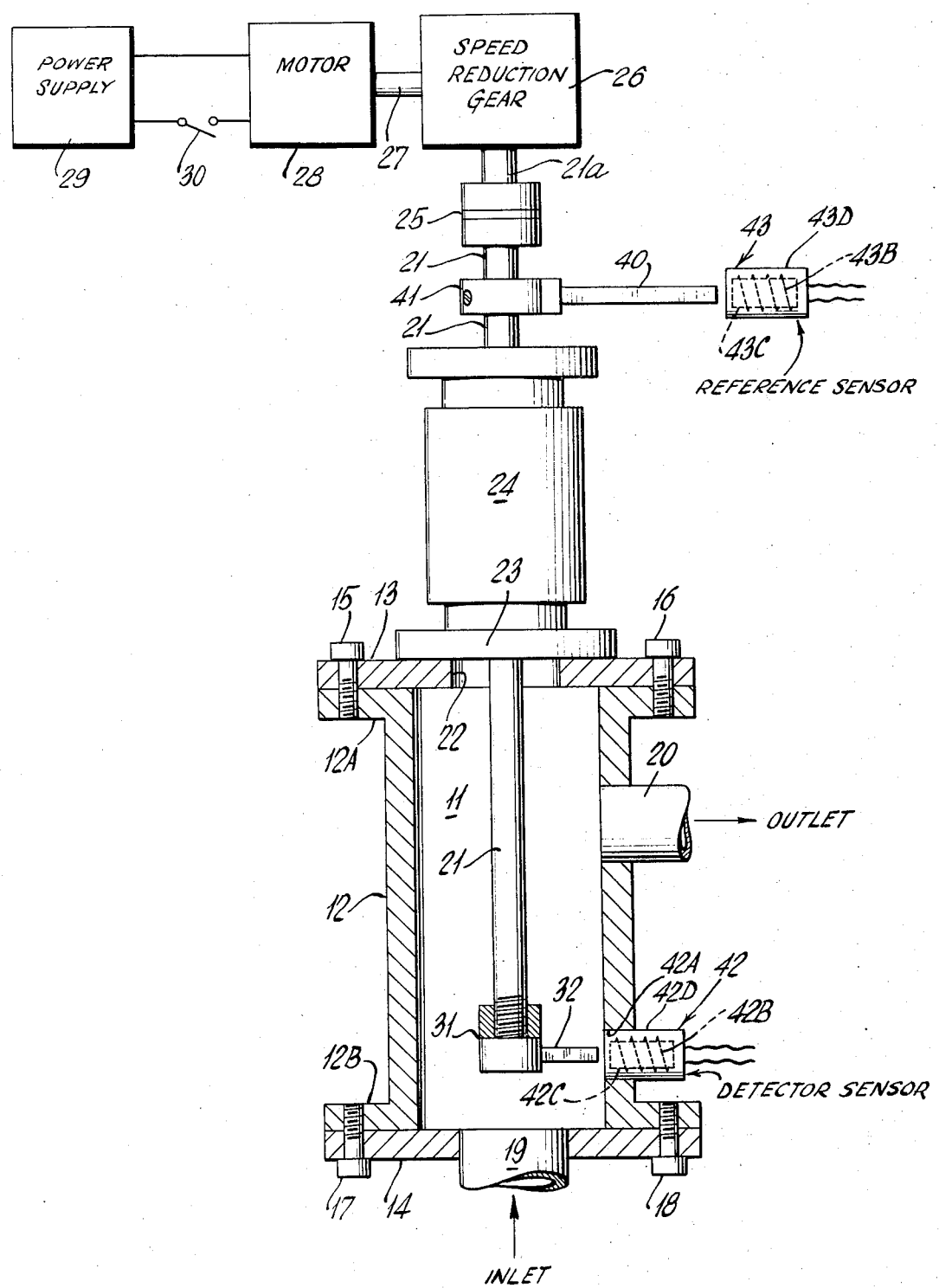
FIG. 1 is a longitudinal view, partly in crosssection, partly in block form, showing consistometer apparatus in accordance with the invention including a measuring chamber containing a rotatable resilient member mounted for rotation on a shaft extending therein from a drive means and having mounted thereon a rigid reference member outside the chamber for rotation therewith, together with appropriate detector means mounted opposite the respective resilient and reference members.

Referring now to FIG. 1, there is shown a consistometer apparatus embodying features of the present invention, wherein a chamber 11 is defined by tubular side walls 12 of appropriate steel or other material suitable to maintain the grease or other material whose consistency is to be measured and having upper and lower end plates 13, 14 bolted to respective upper and lower flanges 12A, 12B on the chamber member 12 by means of bolts 15, 16, 17, 18. At the lower end of the chamber 11, in the lower end plate 14, there is provided an opening for receiving an inlet conduit 19 through which material, such as grease, the consistency of which is to be measured, may be introduced under appropriate pressure in a continuous stream. An outlet conduit 20 is provided at an upper portion of the sidewall 12 of the chamber 11 for outputting a stream of the material passing through the chamber 11 for consistency measurement. Directly above the inlet conduit 19, axially aligned therewith, there is provided a shaft 21 extending into the chamber 11 through an opening 22 in the upper plate 13 from a stuffing box arrangement 23 containing appropriate means for sealing fluid within the chamber under appropriate pressure from bearings (not shown) in a bearing assembly 24 through which the shaft 21 extends upwardly to a mechanical coupling 25 from whence it is driven by means of a speed reduction gear 26 which, in turn, is coupled by means of a drive shaft 27 to an electric motor 28. The electric motor 28 provides means for driving the shaft 21 at a constant speed and is, in turn, electrically coupled to a suitable power supply 29 through appropriate conductors including a switch 30.

The lower end of the shaft 21 within the chamber 11 has affixed thereto a mounting assembly 31, shown threaded to the lower end of the shaft 21, for attaching a resilient reference blade member 32 to the shaft 21. The blade 32 is mounted to the shaft 21 so that the two surfaces about which it is flexible are parallel to the direction of the flow of the material in the stream passing upwardly from the inlet 19 through the chamber 11 and thence out through the outlet 20. The shaft 21 including the assembly 31 and resilient member 32 mounted thereon are rotated at a constant rate as the material being measured is passed through the chamber 11 in the direction of the arrow shown below the inlet 19 in the drawing. The blade 32 may be formed of steel capable of deflection in the material being measured, such as grease, and the end of the blade will be deflected as it rotates in the material by an amount dependent upon the reaction forces exerted thereon by the flowing material as as indication of the consistency of such material.

Means are provided for substantially continuously measuring the amount of deflection or flexure of the resilient member 32 as a measure of the consistency of the material passing through the chamber 11.

In accordance with novel features of the present invention, means are provided for measuring the deflection of the resilient member 32 as material flows through the chamber 11 and as the member 32 is rotated in such flowing material, without introducing electrical connections into the chamber 11 to the member 32. This is accomplished in accordance with a preferred aspect of the present invention by the provision of a reference member 40 mounted on the shaft 21 by means of a mounting assembly 41 which may be in the form of a collar having an appropriate set screw therein for facilitating adjustment of the position of the member 40 on the shaft 21 relative to the position of the resilient member 32 on the shaft 21, as will be discussed in further detail hereinafter. It will be seen from the above that the resilient member 32 and the relatively rigid member 40, both being mounted to the same shaft 21, will rotate in synchronism as the shaft is rotated by the motor 28.

In a preferred embodiment the resilient member 32 and the relatively rigid reference member 40 are mounted to the shaft 21 so that they lie in substantially the same plane with one another and also in the same plane as the central axis of the shaft 21 when the resilient member 32 is in its normal position, i.e., not subjected to forces tending to deflect same.

When the shaft 21 is rotated in a stream of material, such as grease, reaction forces of such material upon the resilient member 32 will cause it to be deflected to an extent dependent upon the consistency of such material. Such deflection will tend to move the end of the member 32 out of the aforementioned common plane by an amount dependent upon the consistency of the material. Means are provided for measuring this deflection of the member 32 comprising a first detector or sensor, referred to as the detector sensor 42, opposite the resilient member 32 and a second detector or sensor, referred to as the reference sensor 43, opposite the rigid member 40. These two sensors 42 and 43 preferably comprise magnetic sensors responsive to the passage of the respective blades 32 and 40. By measuring the time difference between the passage of the two blades 32 and 40 relative to their respective magnetic sensors 42 and 43, it is possible to determine the amount of deflection of the blade 32 in the material passing through the chamber 11 as a means for measuring the consistency thereof. Such time differences can be measured by the use of appropriate electrical circuitry as described in further detail hereinafter, with particular reference to FIG. 2.

It is to be noted that, in the preferred embodiment, the two sensors 42, 43 advantageously comprise respective magnetic sensors mounted within relatively rugged shells or housings formed of stainless steel or the like to withstand the conditions and materials encountered within the chamber 11 as the stream of material being measured passes through. The first or detector sensor 42 is shown mounted within an opening 42A in the wall 12 of the chamber 11, whereby the magnetic sensor is able to detect the flexible detector blade 32 magnetically, without itself being placed within the material passing through the chamber 11. The second or reference sensor 43 is mounted through the use of appropriate means (not shown) for maintaining it opposite the rigid reference blade member 40 so that the reference sensor 43 may sense or detect the reference member 40 magnetically as it moves past same. Advantageously, the magnetic sensor of the second detector 43 may also be mounted within a casing of stainless steel or the like similar to that employed for enclosing the first magnetic sensor 42.

It will be appreciated that the rigid reference member 40 is shown mounted to the shaft 21 at a location outside of the chamber 11. This is the preferred embodiment, since it permits adjustment of the reference blade. However, it is possible to construct apparatus of the type herein disclosed wherein the rigid reference member 40 is mounted to a portion of the shaft 21 within the chamber 11. In such event, the rigid member 40 should be affixed to the shaft at a position downstream from the flexible blade (above the flexible blade 32, as shown in FIG. 1) a sufficient distance to avoid producing any adverse effect on the consistency of the material flowing through the chamber 11 prior to its passing the flexible member 32. In a further embodiment, as described in detail hereinafter, the reference member may comprise a nonmagnetic disc with a magnetic inset, in which event the likelihood of turbulence within the chamber 11 is substantially eliminated.

In the event that the reference member 40 should be positioned within the chamber 11, it may be desirable to provide a longer chamber 11 than otherwise so that the reference member 40 can be spaced beyond the position where it might otherwise influence the consistency of the material whose consistency being measured by the flexible member 32. In the latter event, the second or reference sensor 43 should be positioned within an opening in the side wall 12 of the chamber 11 in a manner similar to the positioning of the first detector and may advantageously be positioned between the location of the outlet 20 and the upper end of the chamber 11 as shown in FIG. 1.

It is to be appreciated that the member 32 is here described as flexible in comparison to the rigid reference member 40. It is to be understood that the rigidity of the member 40 is a relative term depending upon its environment. Accordingly, when mounted outside of the chamber 11 so that the member 40 rotates in the surrounding air, it will not need to be so rigid or stiff as when positioned within the chamber 11 for rotation in the material being measured as discussed above.

It is also to be appreciated that although the flexible member 32 and the reference member 40 are shown positioned in the same plane, it is possible to position the two members in different planes displaced around the axis of the shaft 21 or otherwise mount same for rotation in synchronism, so long as the two sensors are positioned opposite the respective members such that when there is no material in the chamber 11 or when the resilient detector member is stationary in the material in the chamber 11, the two members are in phase at their zero points, namely, the flexible member 32 and the rigid member 40 are both opposite the center of respective sensors 42, 43 at the same time such that when rotated in flowing material under operating conditions the flexible member 32 will be deflected from the corresponding rotational point of the reference member 40 by an amount that is measurable by means of the respective detectors 42, 43 for determinination of the amount of flexure of the blade 32 due to the consistency of the material passing through the chamber 11.

It will be appreciated that the apparatus herein disclosed offers advantages over apparatus where electronic portions thereof are mounted within the chamber wherein the consistency measurement is made as, for example, in those types of apparatus where strain gauges are employed on a resilient member as in the above-referenced patent. Among the advantages is the ability to measure the consistency of streams of material, such as water-based greases, which would otherwise adversely influence the electrical measurements or integrity of the electrical components of their encapsulation. Thus, the present apparatus is quite useful in determining the consistency of water-based greases such as cup greases and the like.

Figure 2:
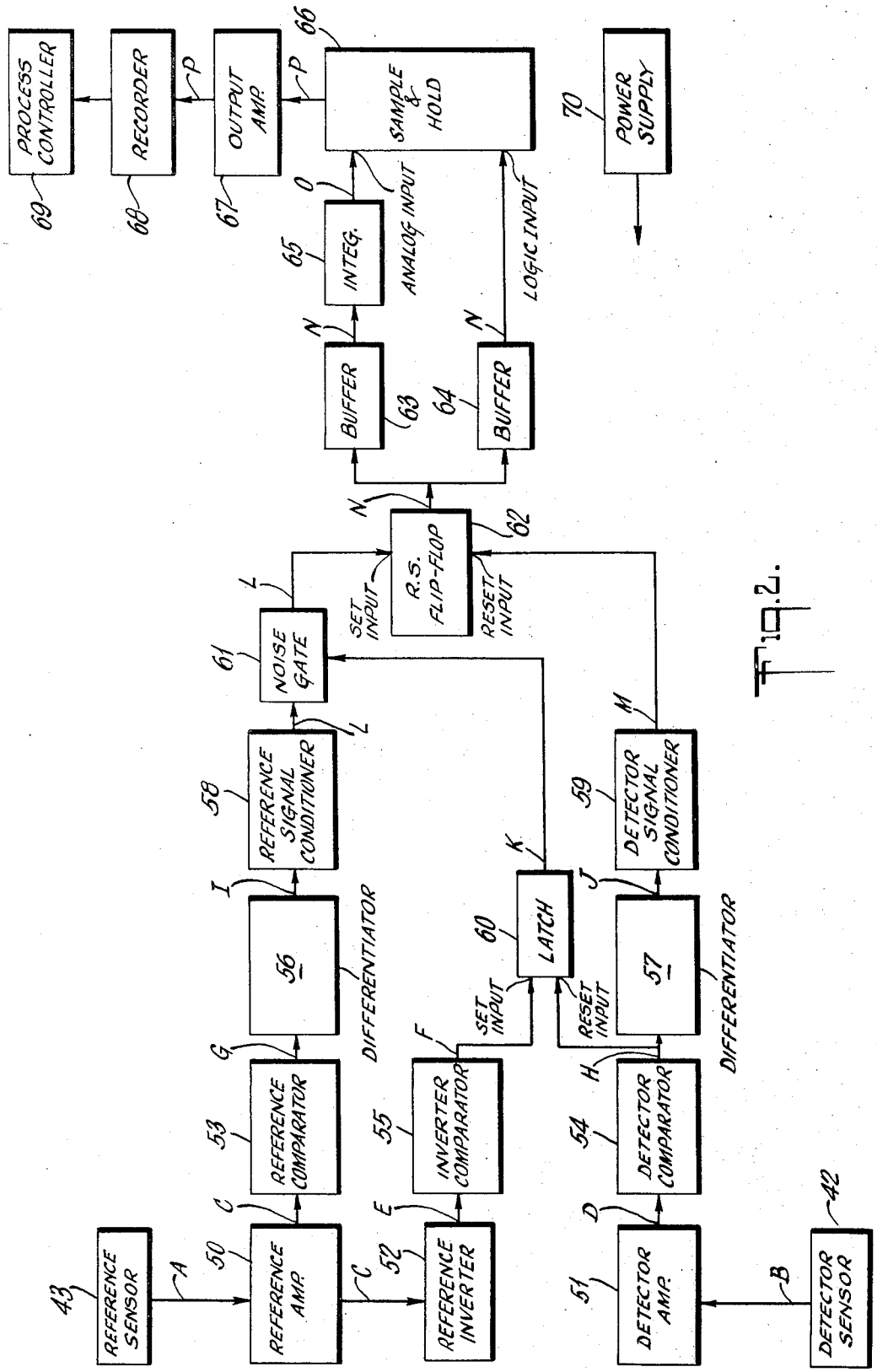
FIG. 2 is a block diagram illustrating schematically an electric circuit for measuring any displacement of the resilient member relative to the rigid reference member of FIG. 1 as they travel past their respective detectors.

Referring now to FIG. 2, there is shown a schematic drawing of electrical circuitry adapted for measuring the deflection of the flexible detector blade 32 relative to the rigid reference blade 40 as the two blades are rotated simultaneously at a constant rate past respective magnetic sensors 42, 43. In particular, as the shaft rotates, the two blades pass through the magnetic field of their respective magnetic sensors at exactly the same time when the instrument is set up without material of measurable consistency in the chamber 11, e.g., with air in the chamber 11. As each of the two blades approaches the respective sensor, an electric current is generated in the coil of the sensor which changes in polarity as the blade crosses the face of the sensor. When the blade crosses the center of the respective sensor the current crosses the zero axis. In this manner the zero crossing point of the electric current marks the exact center of each magnetic sensor.

As grease or other material being measured flows in through the inlet of the chamber 11 and flows past the rotating flexible detector blade member, it is deflected in proportion to the consistency of the grease and the zero crossing of the detector blade past detector 42 is no longer coincident with the crossing of the reference blade past the reference sensor 43. The amount of separation between the two zero crossing points corresponds to the difference in the times when the two blades pass the center or midpoint of their respective sensors and is proportional to blade deflection of the flexible blade which, in turn, is proportional to the consistency of the grease or other material flowing through the chamber 11.

The apparatus shown in FIG. 2 is suitable for measuring the amount of separation between the zero crossing points of the detector and reference blades 32, 40 past the centers of their respective magnetic sensors 42, 43. The apparatus illustrated in FIG. 2 will be discussed with reference to the signal wave forms shown in FIG. 3, which are identified with reference letters corresponding to reference letters at locations on the circuit diagram of FIG. 2 where such signal wave forms appear.

In FIG. 3 the detector sensor 42 and reference sensor 43 provide output signals through the generation of electric currents when the corresponding blade member moves past the respective sensor as discussed above. The outputs of the two magnetic sensors 43, 42 are shown graphically in FIG. 3 as the curves A and B, respectively. All of the curves plotted in FIG. 3 are shown along a common time base $t$, beginning from a time interval $t_0$, which represents a time prior to the arrival of the reference or sensor blades within the magnetic field of the respective sensor as the two blades are rotated in accordance with the invention. As the blade approaches its respective magnetic sensor, an electric current is generated in the sensor which is initially negative and which changes in polarity as the blade passes across the magnetic sensor so that the zero crossing point of the wave form corresponds to the time when the blade passes across the precise center of the sensor. Thus, in FIG. 3 the time $t_1$ represents the beginning of the generation of an electric current as the reference blade 40 begins to cut the field of the reference sensor 43. Likewise, the time $t_2$ represents the time when the detector sensor 42 begins to generate an electric signal B as the detector blade 32, delayed by the material in the chamber 11, begins to pass across its respective magnetic sensor 42. The time interval $t_3$ represents the zero crossing time when the electric signal A passes through its midpoint, representing passage of the reference blade 40 across the midpoint of its magnetic sensor 43. Likewise, the time interval $t_4$ represents the zero crossing time at which the detector blade 32 passes the center of its magnetic sensor 42. In accordance with the preferred aspect of the invention as herein disclosed, the circuit illustrated in FIG. 3 operates to provide an output signal corresponding to the time interval between the two zero crossing times $t_3$ and $t_4$ when the reference and detector blades cross the midpoints of their respective sensors. This is accomplished as follows:

The outputs of the respective reference and detector sensors 43, 42, in the form of the signals A and B, are supplied to respective Reference and Detector Amplifiers 50, 51, both of which are linear amplifiers for amplifying the output signals A and B of the respective sensors 43, 42 without changing their wave form and particularly without changing the relative positions of the zero crossing points $t_3$, $t_4$ of the two signal waves A, B. Thus, the linear amplifiers 50, 51 provide output signals corresponding to the wave forms C and D shown in FIG. 3 which are amplified versions of the signals A and B. The output of the Reference Amplifier 50 is also coupled to a Reference Inverter 52, the function of which is to invert the phase of the incoming signal A applied thereto and amplify same, without otherwise changing its wave form. The output of the Reference Inverter 52 is shown in FIG. 3 as the wave form E, which is an inverted version of the wave form C, but otherwise the same. Thus, the Reference Inverter 52 is essentially a linear amplifier operated in the phase-inverting mode.

The three signals C, D, E are then supplied to respective Comparators 53, 54, 55. Each of the Comparators 53, 54, 55 is characterized by providing an abrupt change of state upon receipt of a positive-going signal. Thus, the three Comparators provide output signals corresponding to the square wave forms F, G and H in FIG. 3. The leading edges of the relatively square wave signals from the Reference and Detector Comparators 53, 54, shown as wave forms G and H, accurately mark the zero crossing points of the signals from the respective magnetic sensors as indicated by the zero crossing points of signals A and B at times $t_3$ and $t_4$, respectively. The leading edge of the wave form F provided by the Inverter Comparator 55 corresponds to the time interval $t_1$ and will be discussed hereinafter.

The output pulses from the Reference and Detector Comparators, shown as wave forms G and H, respectively, are supplied to respective Differentiator circuits 56, 57 to provide differentiated reference and detector signals I and J, respectively, which, in turn, are supplied to respective Signal Conditioners 58, 59. The Signal Conditioners 58, 59 function to clip off the negative-going portions of the input signals I and J, thus eliminating the negative-going spikes of wave forms I and J and producing positive-going pulses L and M, corresponding to the positive-going spikes of the wave forms I and J, respectively. Thus, the output response of the Signal Conditioners 58, 59 are shown as the squared reference and detector pulses L and M, the leading edges of which correspond to the leading edges of the respective positive-going spikes of the differentiated signals I and J. It is noted that the leading edges of these positve-going square reference and detector pulses L and M correspond respectively, to the time intervals $t_3$ and $t_4$ of the zero crossing points of signals A and B. In one embodiment of the invention the positive square pulses L and M each have a pulse width of approximately 10 microseconds.

The output of the Inverter Comparator 55, shown as signal wave form F, is supplied to a Latch circuit 60 for producing a latch pulse K, which is a relatively square wave pulse having a leading edge corresponding to the leading edge of the applied inverter comparator pulse F and trailing edge corresponding to the leading edge of the pulse H from the Detector Comparator which is also supplied thereto.

It will be appreciated that the latch pulse K provided by the Latch circuit 60 may be described as being in the "on" condition from the time $t_1$ to the time $t_4$ and is supplied to the Noise Gate 61 for the purpose of controlling or gating same to the on condition for passing the output signal L from the Reference Signal Conditioner 58 to a first input of the RS Flip-Flop circuit 62. A second input to the RS Flip-Flop circuit 62 is coupled to the output of the Detector Signal Conditioner 59 for receiving the square detector pulse signal M. The RS Flip-Flop circuit 62 is turned on in response to the leading edge of the squared reference pulse L and is turned off in response to the leading edge of the square detector pulse M so that it produces an output signal of the wave form N which is a squarewave positive-going pulse, the leading edge of which corresponds to the time interval $t_3$ and the trailing edge of which corresponds to the time interval $t_4$, as determined by the respective leading edges of the reference pulse L and detector pulse M which, in turn, correspond to the zero crossing points of the reference and detector sensors, respectively.

The RS flip-flop pulse N is coupled to first and second parallel isolating Buffers 63, 64, the first of which has its output coupled to an Integrator 65 which produces an integrated output voltage of the wave form O which, in turn, is supplied to a first or analog input of a Sample-and-Hold circuit 66, which functions to acquire and track the integrated voltage signal O during the time that the flip-flop pulse N is simultaneously applied to a second or logic input of Sample-and-Hold circuit 66 for gating it to the on condition. Upon termination of the RS flip-flop output signal N at the second input of the Sample-and-Hold circuit 66, the latter circuit immediately ceases to sample and track the integrated signal O applied to its first or signal input and switches instantly to hold an output signal of wave form P which it transfers to an Output Amplifier 67 which, in turn, supplies the signal P to a Recorder 68. The signal P is held at the output of the Sample-and-Hold circuit 66 until the onset of the leading edge of the next flip-flop pulse produced during the next operating cycle of the apparatus, e.g., during the next rotational cycle of the reference and detector members, and which is in the wave form Q.

It is to be understood that the analog signal P supplied by the Sample-and-Hold circuit 66 to the Output Amplifier 67, and thence to the Recorder 68, is proportional to the time interval $t_3$–$t_4$, representing the respective zero crossings of the reference and detector blades past the centers of their respective magnetic sensors and is therefore proportional to the deflection of the detector blade by the material in the sample chamber 11, and thus is proportional to the consistency of the material passing through the consistometer instrument. An output signal from the Recorder 68 may be supplied to a Process Controller 69 for producing appropriate signal outputs known to control the operation of a continuous grease process, e.g., in the manner shown in the aforementioned Patent of Richmond, et al. A Power Supply 70 is shown diagrammatically for supplying appropriate operating potentials to the apparatus of FIG. 2.

It is to be understood that through proper manipulation of the controls for span and suppression the Recorder 68 can display an analog signal indicating the relative consistency of the medium or material in which the detector blade is immersed within the chamber 11.

Essentially, the operation of the circuit shown in the preferred embodiment of FIG. 2 for measuring the time difference between the zero crossing points of signals A and B at time intervals $t_3$ and $t_4$, respectively, functions by applying the reference and detector pulses L and M to the set and reset inputs, respectively, of the RS Flip-Flop circuit 62 in order to produce the square wave form output pulse N, the duration of which corresponds to the time interval between the leading edges of the reference pulse L and detector pulse M at time intervals $t_3$ and $t_4$, respectively.

In FIG. 2, the Noise Gate 61 provides means for preventing spurious noise from reaching the set input of the RS Flip-Flop circuit 62 and which might otherwise provide false signal indications which might be erroneously recorded as measurements of the time interval $t_3 - t_4$. The Noise Gate 61 prevents this from occurring by permitting signals to reach the set input of the RS Flip-Flop 62 only during selected times when the respective blades are in the vicinity of the respective sensors, thus preventing spurious signals from reaching the set input of the RS Flip-Flop circuit during most of the operating cycle of the rotating reference and detector blades. The Noise Gate 61 is controlled by the latch pulse K from the Latch circuit 60 which may be a bistable multivibrator for providing the pulse of wave form K for opening the Noise Gate 61 only during the time determined by the leading edges of the inverter comparator pulse F and the detector comparator pulse H. The leading edge of the pulse F from the Inverter Comparator 55 corresponds to the time $t_1$ when the reference blade just begins to enter the magnetic field of the reference sensor and the leading edge of the pulse H from the Detector Comparator 54 corresponds to the time $t_4$ when the detector blade passes through the zero crossing point of the detector sensor. Thus, the latch pulse K activates the Noise Gate only during the time interval $t_1$ through $t_4$ which is the time from the arrival of the reference blade at the magnetic flux of the reference sensor until the time the detector blade crosses the magnetic center of the detector sensor.

It is to be appreciated that although the preferred embodiment is as illustrated in FIG. 2 wherein the Noise Gate is employed, the apparatus disclosed herein can be employed to measure the consistency of the materials such as grease without the use of the Noise Gate and its associated control circuitry, in which event the output L of the Reference Signal Conditioner 58 would be coupled directly to the set input of the RS Flip-Flop 62, rather then through the Noise Gate 61, as shown.

In carrying out the herein disclosed invention, a conventional magnetic pickup may be employed. For example, a suitable detector is the model 700-0941-A marketed by AIRPAX Electronics, Seminole Division, P.O. Box 8488, Fort Lauderdale, Fla. 33310.

The speed of rotation of the resilient member in the Chamber 11 may vary according to the nature of the material being measured and the length of the detector blade. For example, suitable measurements have been made using speeds in a range of 37 to 74 rpm, depending upon the material. A typical value for grease is 52 rpm. However, this may vary according to the length of the detector blade.

As discussed above, a further embodiment of the present invention involves the provision of a reference member in the form of a nonmagnetic disc which may be formed of material such as brass, and which has located on the perimeter thereof a magnetic reference element which may comprise an insert such as a ferrous strip imbedded therein, and which may be formed of the same material as the resilient detector member. In one embodiment the reference member has been constructed of a brass disc having a carbon steel reference element imbedded therein. In one embodiment the carbon steel reference element had a thickness of 0.01 inch, which corresponded closely to the thickness of the resilient detector member.

It is to be understood that when the reference member is in the form of a disc, as thus described, it may be positioned on the shaft 21 outside of the chamber 11, as shown in FIG. 1, in which case the disc would replace the element 40 and should have substantially the same radial dimension as that of the resilient detector member 32. It should be noted that this is preferably the case, i.e., the reference and detector members should preferably have substantially the same radial dimension from the center of the shaft outwardly to the tip or perimeter thereof, whether the reference member comprises a blade as shown in FIG. 1 or a disc as herein described, so that the reference member and the detector member will have the same velocity in passing their respective sensors.

In the case where the reference member is formed in the shape of a nonmagnetic disc with a magnetic insert, as described above, it may be mounted within the chamber 11 on the shaft 21, preferably above the outlet 20, as shown in FIG. 1, and the disc should have an outside diameter closely approaching the inside diameter of the chamber 11, so that the reference sensor will detect a signal therefrom which is similar to the signal obtained by the detector sensor from the reference blade member 32, subject only to difference in times of detection, as determined by the deflection of the resilient detector blade 32 in the material within the chamber 11.

The apparatus herein disclosed is capable of measuring the consistency of various materials. It is to be understood that the term "consistency" as used herein is intended broadly to include viscosity, but is not limited thereto. Thus, consistency is intended to apply to both Newtonian fluids such as water, alcohol, oil, etc., and to non-Newtonian fluids such as grease, paper pulp slurries, oil-well drilling fluids, paint, polymers, etc.

The preferred embodiment of the apparatus herein disclosed is concerned with measurement of consistency wherein the flexible detector member is rotated about an axis parallel to the direction of flow of the material being measured. It is to be understood, however, that novel aspects of the present invention may also be applied to such consistency measuring systems wherein the axis of rotation of the resilient member deviates somewhat from the direction of flow of such material. In the latter case, however, it should be appreciated that the velocity of flow and density of the material(s) comprising the stream will exert a force against the flexible member such that both the velocity of flow and density should be maintained relatively constant, or otherwise be taken into account in evaluating the consistency measurements.

We claim:

1. Apparatus for continuously measuring the consistency of a stream of material comprising a rotatable resilient member located in said stream so that the opposite surfaces about which said member is flexible are substantially parallel to the direction of flow in said stream, means for rotating said member at a constant rate about an axix which is parallel to the direction of flow in said stream, means for sensing the condition of flexure of said member in order to provide a measurement of the reaction forces exerted by said material on said resilient member substantially entirely in a direction normal to said direction of flow of said material, comprising a reference member, means for rotating said reference member in synchronism with said resilient member, and means for substantially continuously measuring time displacement between said reference member and said resilient member as a measure of the deflection of said resilient member due to said material, thereby providing a measurement indicating the consistency of the material substantially independently of the rate of flow of said material in said stream.

2. Apparatus in accordance with claim 1, wherein said resilient member is a thin, flat, flexible paddle, said paddle presenting its thin edge to the flowing stream.

3. Apparatus in accordance with claim 1, wherein said means for measuring the reaction forces exerted on said resilient member comprises means for measuring the time difference between the passage of the reference member and resilient member past respective sensor devices.

4. Apparatus as defined in claim 3, wherein the respective sensor devices comprise magnetic sensors.

5. Apparatus as defined in claim 4, wherein the means for measuring the time difference between the passage of the respective members relative to their respective magnetic sensors comprise means for producing first and second electric signal pulses having leading edges corresponding to the zero time crossings at which the respective members pass the magnetic centers of their respective magnetic detectors and further comprising means for determining the time difference between the leading edges of the respective first and second electric signal pulse.

6. Apparatus as defined in claim 5, wherein the means for determining the time difference between the leading edges of the respective first and second electric signal pulses comprises means for producing a third electric pulse having a time duration corresponding to the time difference between said leading edges.

7. Apparatus as defined in claim 6, comprising means for producing an analog signal whose amplitude varies in accordance with the time duration of said third electric pulse.

8. Apparatus as defined in claim 7, wherein the means for producing said analog signal corresponding to the time duration of said third electric pulse comprises an integrator for producing an analog signal whose amplitude is proportional to the duration of said third pulse and means for determining the amplitude of the output of said integrator.

9. Apparatus as defined in claim 4, wherein the means for measuring the time difference between the passage of the respective members relative to their respective magnetic sensors comprise means for producing electric pulses corresponding to the respective outputs of the magnetic sensors and a means for determining the time difference between the beginning points of the respective electric pulses by producing a third electric pulse having a time duration corresponding to the time difference between said beginning points.

10. Apparatus as defined in claim 9, wherein the beginning points of the respective electric pulses correspond to the zero time crossings at which the respective members pass the magnetic centers of their respective magnetic detectors.

11. Apparatus for continuously measuring the consistency of a stream of material comprising a resilient member, said resilient member having a flexible end portion and being located in said stream and disposed so that the opposite surfaces about which said member is flexible are substantially parallel to the direction of flow of said material in said stream, means for causing rotational movement between said material and said resilient member at a constant rate about an axis which is parallel to the direction of flow of said material in said stream, means for sensing the condition of flexure of said member in order to provide a measurement of the reaction forces exerted on said resilient member by said material substantially entirely in a direction normal to said direction of flow of said material during said rotation relative to said material comprising a reference member and means for maintaining said reference member in synchronism with said resilient member, and means for measuring displacements between said reference member and the flexible end portion of said resilient member due to flexure of said resilient member.

12. Apparatus for substantially continuously measuring the consistency of a material comprising a chamber adapted to have a stream of said material passed therethrough in a given direction, means for continuously measuring the consistency of a stream of material passing through said chamber comprising a rotatable resilient member located in said chamber and mounted for rotation so that the opposite surfaces about which said member is flexible are substantially parallel to the direction of flow of a stream of said material along said axis in said given direction, means for rotating said member at a constant rate about an axis which is parallel to said given direction of flow of said stream, means for sensing the condition of flexure of said member in order to provide a measure of the reaction forces exerted on said resilient member substantially entirely in a direction normal to said direction of flow of said material during rotation of said resilient member in said material comprising a reference member, means for rotating said reference member in synchronism with said resilient member, and means for substantially continuously measuring the time displacement between said reference member and said resilient member, thereby measuring the consistency of the material substantially independently of the rate of flow of said material in said stream.

13. Apparatus as defined in claim 12, wherein said resilient member is a thin, flat, flexible blade, said paddle having its thin edge aligned with said given direction of flow of said stream.

14. Apparatus as defined in claim 12, wherein said resilient member is positioned within said chamber and wherein said reference member is positioned outside of said chamber.

15. Apparatus as defined in claim 14, wherein said resilient member and said reference member are mounted to a common shaft for rotation together and wherein the resilient member is mounted to a portion of said shaft extending within said chamber and wherein said reference member is mounted to a portion of said shaft external of said chamber.

16. Apparatus as defined in claim 15, wherein said resilient member and said reference member normally lie in the same plane as the axis of said shaft when said resilient member is in the undeflected condition.

17. Apparatus as defined in claim 12, wherein the means for sensing the relative positions of the resilient and reference members comprise respective magnetic sensors positioned opposite the respective resilient and reference members.

18. Apparatus as defined in claim 12, wherein the means for sensing the relative positions of said flexible member and said reference member comprise respective magnetic sensors for generating respective zero crossing signals which change polarity at the time intervals corresponding to the times when the respective members pass the magnetic centers of the respective magnetic sensors, together with means coupled to said sensors for measuring the difference in the times of occurrence of said zero time crossing signals.

19. Apparatus as defined in claim 18, wherein the means for measuring the difference in the times of occurrence of said zero time crossing signals comprises means for producing corresponding electric pulses whose leading edges correspond to the occurrence of said zero time crossing signals and means for measuring the time difference between the said leading edges.

20. Apparatus as defined in claim 19, wherein said means for measuring the time difference between said leading edges of said corresponding electric pulses comprises means for generating a further pulse whose duration corresponds to the time interval between said leading edges.

21. Apparatus as defined in claim 20, wherein said means for measuring said time difference between said leading edges comprises means for converting said further pulse to an analog signal whose amplitude corresponds to the duration of said further pulse.

22. Apparatus as defined in claim 21, wherein said means for converting said further pulse to said analog signal of amplitude proportional to said time duration comprises means for integrating said further pulse.

23. Apparatus as defined in claim 20, further comprising means for selectively gating said electric pulse whose leading edge corresponds to the occurrence of the zero time crossing signal for said reference sensor to said means for generating a further pulse whose duration corresponds to the time interval between said leading edges only during a selected time interval when the respective blades are in the vicinity of the respective sensors.

24. Apparatus as defined in claim 23, wherein the means for selectively gating said electric pulse whose leading edge corresponds to the occurrence of the zero time crossing signal for said reference sensor comprises a noise gate having a control input coupled to the output of said latch circuit comprising a bistable multivibrator having set and reset inputs, said set input being coupled to means for deriving a set signal from said reference sensor for opening said noise gate at a time interval corresponding to the arrival of the leading edge of said reference member at said reference sensor, said reset input being coupled to means for deriving a reset signal from said detector sensor for closing said noise gate at a time which corresponds to the zero time crossing of said resilient member past said detector sensor.

25. Apparatus for continuously measuring the consistency of a stream of material comprising a rotatable resilient detector member located in the path of said stream so that the opposite surfaces about which said member is flexible are substantially parallel to the direction of flow in said stream, means for rotating said resilient detector member at a constant rate about an axis which is parallel to the direction of flow in said stream, means for sensing the condition of flexure of said member in order to provide a measurement of the reaction forces exerted by said material on said resilient member substantially entirely in a direction normal to said direction of flow of said material, comprising a reference member, means for rotating said reference member in synchronism with said resilient member, and means for substantially continuously measuring time displacement between said reference member and said resilient member due to deflection of said resilient member by said material, thereby providing a measurement indicating the consistency of the material substantially independently of the rate of flow of said material in said stream, said means for measuring the displacement of said resilient detector member comprising means for measuring the time difference between the passage of the reference member and the resilient member past respective sensor devices, said means for measuring said time difference comprising means for producing first and second electric pulses having leading edges corresponding, respectively, to the times at which said reference and resilient members pass predetermined portions of their respective sensors, means for determining the time difference between the leading edges of the respective first and second electric pulses, and means for selectively gating said first electric pulse to said means for determining said time difference between said leading edges of said first and second electric pulses only during a predetermined time when said reference and resilient members are in the vicinity of their respective sensors.

26. Apparatus as defined in claim 25, wherein the means for determining the time difference between the leading edges of the respective first and second electric pulses comprises means for producing a third electric pulse having a time duration corresponding to the time difference between said leading edges.

27. Apparatus as defined in claim 26, comprising means for producing an analog signal whose amplitude varies in accordance with the time duration of said third electric pulse.

28. Apparatus as defined in claim 25, wherein the respective sensor devices comprise magnetic sensors.

29. Apparatus as defined in claim 26, wherein the respective sensor devices comprise magnetic sensors.

30. Apparatus as defined in claim 28, wherein the beginning points of the respective electric pulses correspond to the zero time crossings at which the respective members pass the magnetic centers of their respective magnetic sensors.

31. Apparatus as defined in claim 29, wherein the beginning points of the respective electric pulses correspond to the zero time crossings at which the respective members pass the magnetic centers of their respective magnetic detectors.

32. Apparatus as defined in claim 25, wherein said means for selectively gating said first electric pulse to said means for determining said time difference comprises a noise gate coupled to the output of a latch circuit comprising a bistable multivibrator having set and reset inputs wherein said set of said latch circuit is coupled to means for deriving a set signal from said reference sensor which corresponds to a time when the reference member approaches the referense sensor, and wherein the reset input of said latch circuit is coupled to means for deriving a reset signal from said detector sensor which corresponds to the time of the occurrence of the leading edge of said second electric pulse.

33. Apparatus for continuously measuring the consistency of a stream of material comprising a rotatable resilient detector member located in the path of said stream so that the opposite surfaces about which said member is flexible are substantially parallel to the direction of flow in said stream, means for rotating said resilient detector member at a constant rate about an axis which is parallel to the direction of flow in said stream, means for sensing the condition of flexure of said member in order to provide a measurement of the reaction forces exerted by said material on said resilient member substantially entirely in a direction normal to said direction of flow of said material, comprising a reference member, means for rotating said reference member in synchronism with said resilient member, and means for substantially continuously measuring time displacement between said reference member and said resilient member due to deflection of said resilient member by said material, thereby providing a measurement indicating the consistency of the material substantially independently of the rate of flow of said material in said stream, said means for measuring the displacement of said resilient detector member comprising a reference sensor positioned adjacent the travel path of said reference member, a detector sensor positioned adjacent the travel path of said resilient detector member, and means for measuring the time difference between the passage of the reference member and the resilient member past their respective sensor devices, said means for measuring said time difference comprising means for producing a first electric pulse having a leading edge corresponding to the time at which said reference member passes a predetermined portion of said reference sensor, means for producing a second electric pulse having a leading edge corresponding to the time at which said reference member passes a predetermined portion of said reference sensor, means for determining the time difference between the leading edges of the respective first and second electric pulses, and means for selectively gating said first electric pulse to said means for determining said time difference between said leading edges of said first and second electric pulses only during a predetermined time when said reference and resilient members are in the vicinity of their respective sensors.

* * * * *